United States Patent [19]
Tanimoto et al.

[11] Patent Number: 5,900,463
[45] Date of Patent: May 4, 1999

[54] WATER RESISTANT COMPOSITION

[75] Inventors: Seiji Tanimoto; Masato Nakamae; Toshiaki Sato, all of Kurashiki, Japan

[73] Assignee: Kuraray Co., Ltd., Kurashiki, Japan

[21] Appl. No.: 08/944,553

[22] Filed: Oct. 7, 1997

[30] Foreign Application Priority Data

Oct. 7, 1996 [JP] Japan ..................... 8-265801

[51] Int. Cl.$^6$ ................. C08F 8/08; C08F 8/28; C08F 16/06; C08F 8/30
[52] U.S. Cl. ............ 525/61; 524/114; 524/197; 524/354; 525/58; 525/387
[58] Field of Search ............... 524/114, 197, 524/354; 525/58, 61, 387

[56] References Cited

U.S. PATENT DOCUMENTS 2,362,026 11/1944 Quist ........................ 524/255
4,708,947 11/1987 Maruyama et al. ............ 525/58

FOREIGN PATENT DOCUMENTS

| 0 413 136 | 2/1991 | European Pat. Off. . |
| 0 743 172 | 11/1996 | European Pat. Off. . |
| 0 757 060 | 2/1997 | European Pat. Off. . |
| 61-211081 | 9/1986 | Japan . |

*Primary Examiner*—Peter A. Szekely
*Attorney, Agent, or Firm*—Oblon, Spivak, McClelland, Maier & Newstadt, P.C.

[57] ABSTRACT

A composition comprising (A) polyvinyl alcohol having an amino group connected to a phenyl group and (B) at least one water resistance-imparting agent selected from polyepoxy compound, aldehyde compound, polyisocyanate compound, and water-soluble oxidizing agent; the composition exhibits outstanding water resistance even when used at room temperature; the composition finds use as a woodworking adhesive, plywood adhesive, and two-part instantaneously curing adhesive which does not require heating for curing.

20 Claims, No Drawings

WATER RESISTANT COMPOSITION

BACKGROUND OF THE INVENTION

1. Field of the Invention

The present invention relates to a composition superior in water resistance which comprises a specific polyvinyl alcohol resin.

2. Description of the Prior Art

Polyvinyl alcohol (occasionally referred to as PVA hereinafter) has been widely used as a variety of binders, adhesives, and surface-treating agents. It is unrivaled by any other water-soluble resins in its good film-forming properties and high strength. Unfortunately, it suffers a disadvantage of being poor in water resistance, especially water resistance at low temperatures in a dry state, because of its water solubility. Several methods have been proposed to eliminate this disadvantage. Examples include its crosslinking with glyoxal, glutaraldehyde, dialdehyde starch, water-soluble epoxidized compound, or methylol compound. A disadvantage of the crosslinking method is the necessity of heat treatment for a long time at an elevated temperature above 100° C., or above 120° C., render the PVA completely water resistant. On the other hand, rendering PVA water resistant at low temperatures in a dry state needs a strong acid condition at a pH 2 or below. This method poses problems with instability in the viscosity of PVA aqueous solution and with gelation during use. In addition, the resulting product does not exhibit satisfactory water resistance. Other known methods include crosslinking carboxylic acid-containing PVA with polyamide epichlorohydrin resin and crosslinking acetoacetyl group-containing PVA with glyoxal (or any other polyaldehyde). These methods still present a disadvantage in that the resulting product does not exhibit satisfactory water resistance and its aqueous solution has poor viscosity stability.

SUMMARY OF THE INVENTION

It is an object of the present invention to provide a PVA water resistant composition which exhibits excellent water resistance to cold water as well as hot water, while giving rise to a solution free from viscosity instability, even though it is heat-treated or dried at low temperatures (from room temperature to about 50° C.).

The objects of the present invention are accomplished by providing a composition comprising (A) polyvinyl alcohol having an amino group connected to a phenyl group (referred to as aromatic amino group hereinafter) and (B) at least one water resistance-imparting agent selected from polyepoxy compound, aldehyde compound, polyisocyanate compound and water-soluble oxidizing agent. The present invention is based on this finding.

DESCRIPTION OF PREFERRED EMBODIMENTS

One component of the composition of the present invention is PVA having an aromatic amino group. This PVA is not specifically restricted in its structure so long as it has an amino group connected to a phenyl group. Examples include PVA having the structural unit represented by the formula (1) or (2) below, PVA having an aromatic amino group which is obtained by reacting (or acetalizing) PVA with an aldehyde having an aromatic amino group, and PVA having the unit of vinyl aminobenzoate. Of these examples, the first one is most suitable.

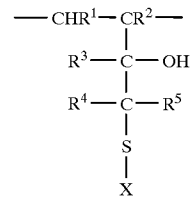

(1)

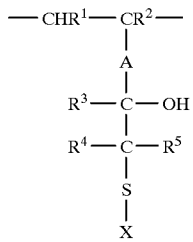

(2)

In formulas (1) and (2) $R^1$, $R^2$, $R^3$, $R^4$, and $R^5$ each denotes a hydrogen atom or a hydrocarbon group, which may have a substituent group, of carbon number 8 or below; A denotes a divalent hydrocarbon group or a divalent hydrocarbon group containing at least one heteroatom selected from a nitrogen atom, oxygen atom, or sulfur atom; S denotes a sulfur atom, and X denotes a monovalent group containing an amino group connected to a phenyl group.

In the above-mentioned formulas (1) and (2), the structural units $R^1$, $R^2$, $R^3$, $R^4$, and $R^5$ are not specifically restricted so long as they are a hydrogen atom or a hydrocarbon group, which may have a substituent group, of carbon number 8 or below. In a preferred instance, $R^1$ is a hydrogen atom, $R^2$ is a hydrogen atom or methyl group, and $R^3$, $R^4$, and $R^5$ each are a hydrogen atom or a hydrocarbon group of carbon number 8 or below, preferably 6 or below. Further, $R^3$ and $R^4$ (or $R^5$) may form a ring.

In the structural unit represented by the formula (2), A is not specifically restricted in structure so long as it is a divalent hydrocarbon group or a divalent hydrocarbon group containing at least one heteroatom selected from nitrogen atom, oxygen atom, or sulfur atom. Examples include —(CH$_2$)$_n$— (where n=1–10, preferably 1–8), —CH$_2$ OCH$_2$—, —OCH$_2$—, —CONH-ph-OCH$_2$—, —CONHCH$_2$—, —CONHCH$_2$ OCH$_2$—, —CONHCH$_2$ OCH$_2$ CH$_2$—, —CONHCH$_2$ OCH$_2$ CH$_2$ CH$_2$—, —CONHCH$_2$ OCH$_2$ CH$_2$ CH$_2$ CH$_2$—, —CONHCH$_2$-ph-(CH$_3$)$_2$ —CH$_2$— (where "ph" denotes a phenyl group).

In the structural unit represented by the formula (1) or (2), X is not specifically restricted in structure so long as it is a monovalent group containing an amino group connected to a phenyl group. Examples include -ph-NH$_2$ (1,2-), -ph-NH$_2$ (1,3-)-, -ph-NH$_2$ (1,4-), —CH$_2$ -ph-NH$_2$ (1,2-), —CH$_2$ -ph-NH$_2$ (1,3-), —CH$_2$ -ph-NH$_2$ (1,4-), —CH$_2$ CH$_2$ -ph-NH$_2$ (1,2-), —CH$_2$ CH$_2$ -ph-NH$_2$ (1,3-), —CH$_2$ CH$_2$ -ph-NH$_2$ (1,4-), -ph(CH$_3$)—NH$_2$ (1,2,3-), -ph(CH$_3$)—NH$_2$ (1,2,4-), -ph(CH$_3$)—NH$_2$ (1,2,5-), -ph(CH$_3$)—NH$_2$ (1,2,6-), -nph-NH$_2$ (1,2-), -nph-NH$_2$ (1,4-), and -nph-NH$_2$ (1,8-), (where "ph" denotes a phenyl group and "nph" denotes a naphthyl group).

In the above formulas, where two numerals are in parenthesis, the first numeral (always 1) stands for a position where a phenyl group or a naphthyl group is connected to —S—, and the second numeral stands for a position where —NH$_2$ group is connected to a phenyl group or a naphthyl group, in which each position is counted from the number of the position of a phenyl group or a naphthyl group that number being 1 (see examples below).

Where three numerals are in parenthesis, the first numeral (always 1) stands for a position where a phenyl group or a naphthyl group is connected to —S—, the second numeral stands for the position where —CH₃ is connected to a phenyl group or a naphthyl group, and the third numeral stands for a position where —NH₂ group is connected to a phenyl group or a naphthyl group, in which each position is counted from the number of the position of a phenyl group or a naphthyl group that position being 1.

For example

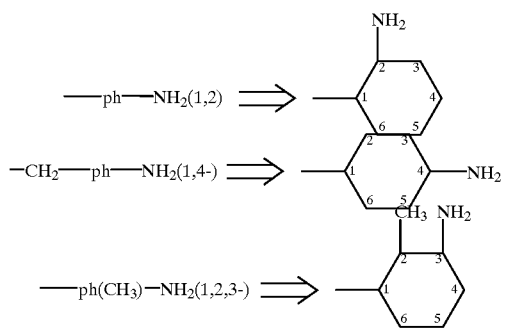

The structural unit containing an amino group connected to a phenyl group should be contained in an amount of 0.01 to 30 mol %, and it may be distributed in any manner in the polymer. With a content less than 0.01 mol %, it does not fully exhibit its effect. With a content more than 30 mol %, it has an adverse effect on the storage stability of the water-resistant composition (causing gelation, for example). Its content should preferably be 0.02–20 mol %, more preferably 0.05–15 mol %.

PVA is not specifically restricted in viscometric average degree of polymerization (simply referred to as degree of polymerization hereinafter) and degree of hydrolysis. PVA may be selected according to the intended use. The degree of polymerization is usually 50– 10000, preferably 100–7000, more preferably 100–5000. The degree of hydrolysis is higher than 50 mol %, preferably higher than 70 mol %. PVA with a degree of hydrolysis lower than 50 mol % is low in water solubility.

The water resistance-imparting agent, as the component (B) of the composition of the present invention, is at least one member selected from polyepoxy compound, aldehyde compound, polyisocyanate compound, and water-soluble oxidizing agent.

Examples of the polyepoxy compound include but are not limited to: glycidyl ether such as diglycidyl ether of bisphenol A, di-β-methylglycidyl ether of bisphenol A, diglycidyl ether of bisphenol F, tetraglycidyl ether of tetrahydroxyphenylmethane, resorcinol diglycidyl ether, diglycidyl ether of brominated bisphenol A, diglycidyl ether of chlorinated bisphenol A, diglycidyl ether of hydrogenated bisphenol A, diglycidyl ether of alkylene oxide adduct of bisphenol A, novolak glycidyl ether, diglycidyl ether of polyalkylene glycol, glycerin triglycidyl ether, pentaerythritol diglycidyl ether, and epoxy urethane resin; glycidyl ether-ester such as glycidyl ether-ester of p-oxybenzoic acid; glycidyl ester such as diglycidyl ester of phthalic acid, diglycidyl ester of tetrahydrophthalic acid, diglycidyl ester of hexahydrophthalic acid, diglycidyl ester of acrylic acid, and diglycidyl ester of dimer acid; glycidyl amine such as glycidyl aniline, tetraglycidyl diaminodiphenylmethane, triglycidyl isocyanurate, and triglycidyl aminophenol; linear aliphatic epoxy resin such as epoxidized polybutadiene and epoxidized soybean oil; and alicyclic epoxy resin such as 3,4-epoxy-6-methylcyclohexylmethyl-3,4-epoxy-6-methylcyclohexane carboxylate, 3,4-epoxycyclohexylmethyl-(3',4'-epoxycyclohexane) carboxylate, bis(3,4-epoxy-6-methylcyclohexylmethyl) adipate, vinylcyclohexene diepoxide, dicyclopentadiene oxide, bis(2,3-epoxycylcopentyl)ether, limonene dioxide and polyamide epichlorohydrin.

Examples of the aldehyde compound include but are not limited to: monoaldehyde such as formaldehyde, acetaldehyde, propionealdehyde, crotonealdehyde and benzaldehyde; and dialdehyde such as glyoxal, malonaldehyde, glutaraldehyde, pimelic dialdehyde, suberic dialdehyde, and dialdehyde starch.

Examples of the polyisocyanate include but are not limited to: tolylenediisocyanate (TDI), hydrogenated TDI, trimethylolpropane-TDI adduct (e.g., "Desmodur L" from Bayer AG), triphenylmethanetriisocyanate, methylene-bis-diphenylisocyanate (MDI), hydrogenated MDI, polymerized MDI, hexamethylenediisocyanate, xylylenediisocyanate, 4,4-dicyclohexyldiisocyanate, and isophoronediisocyanate. An isocyanate dispersed in water by the aid of an emulsifier.

Examples of the water-soluble oxidizing agent are: persulfate (such as ammonium persulfate, potassium persulfate, and sodium persulfate), hydrogen peroxide, benzoyl peroxide, dicumyl peroxide, cumene hydroperoxide, t-butylhydroperoxide, potassium bromate, t-butyl peracetate, and t-butyl benzoate. They may be used alone or in combination with one another.

The composition of the present invention comprises PVA having an aromatic amino group (as component A) and a water resistance-imparting agent (as component B) in a ratio (A/B) of from 99.99/0.01 to 10/90, preferably from 99.9/0.1 to 70/30, by weight. With a ratio greater than 99.99/0.01, the resulting composition has poor water resistance. With a ratio smaller than 10/90, the resulting composition has poor viscosity stability.

The PVA used in the present invention, which has an aromatic amino group containing the structural unit represented by the formula (1) or (2), can be obtained by copolymerization of vinyl ester monomer with a monomer containing an epoxy group and subsequent reaction of the copolymer with mercaptan having an aromatic amino group, followed by hydrolysis.

The copolymerization of vinyl ester monomer with an epoxy group-containing monomer may be accomplished by any known method such as bulk polymerization, solution polymerization, suspension polymerization, or emulsion polymerization. The first two methods are commonly used, in which case polymerization is carried without solvent or in the presence of a solvent such as alcohol. Emulsion polymerization is employed to produce a polymer with a high degree of polymerization. Solution polymerization employs lower alcohol such as methyl alcohol, ethyl alcohol, and propyl alcohol. The copolymerization is carried out in the presence of a known azo or peroxide initiator such as α,α'-azobisisobutyronitrile, 2,2'-azobis(2,4-dimethylvaleronitrile), 2,2'-azobis(4-methoxy-2,4-dimethylvaleronitrile), benzoyl peroxide, and n-propylperoxycarbonate. The polymerization temperature is not specifically restricted; however, it is usually in the range of −30° C. to 150° C.

The above-mentioned reaction between the polymer composed of vinyl ester monomer and epoxy group-containing monomer and mercaptan having an aromatic amino group is carried out without solvent or in a solvent (such as alcohol) in the presence of an alkaline catalyst such as triethylamine, diethanolamine, and sodium hydroxide. The reaction temperature is not specifically restricted, but it is usually in the range of −30° C. to 150° C.

The vinyl ester monomer used in the above-mentioned process includes vinyl formate, vinyl acetate, vinyl propionate, and vinyl pivalate; the vinyl formate is preferred.

The modified polyvinyl ester obtained by the above-mentioned process may be composed only of vinyl ester monomer and an epoxy group-containing monomer; however, it may be copolymerized with an ethylenically unsaturated monomer in an amount not harmful to the effect of the present invention.

Examples of ethylenically unsaturated monomers are: an olefin such as ethylene, propylene, 1-butene, and isobutene; an unsaturated acid or salt thereof or mono- or di-($C_{1-18}$) alkyl ester thereof, such as acrylic acid, methacrylic acid, crotonic acid, phthalic acid or its anhydride, maleic acid or its anhydride, and itaconic acid or its anhydride); an acrylamide such as acrylamide, N—($C_{1-18}$)alkylacrylamide, N,N-dimethylacrylamide, 2-acrylamidepropanesulfonic acid or a salt thereof, and acrylamidepropyldimethylamine or a salt thereof or a quaternary salt thereof; a methacrylamide such as methacrylamide, —($C_{1-18}$)alkylmethacrylamide, N,N-dimethylmethacrylamide, 2-methacrylamidepropanesulfonic acid or a salt thereof, and methacrylamidepropyldimethylamine or a salt thereof or a quaternary salt thereof; a N-vinylamide such as N-vinylpyrrolidone, N-vinylformamide, and N-vinylacetamide; a vinyl cyanide such as acrylonitrile and methacrylonitrile; a vinyl ether such as $C_{1-18}$alkyl vinyl ether, hydroxyalkyl vinyl ether, and alkoxyalkyl vinyl ether; a vinyl halide such as vinyl chloride, vinylidene chloride, vinyl fluoride, vinylidene fluoride, and vinyl bromide; a vinylsilane such as trimethoxyvinylsilane; and allyl acetate, allyl chloride, allyl alcohol, dimethylallyl alcohol, trimethyl-(3-acrylamide-3-dimethylpropyl)-ammonium chloride, and acrylamide-2-methylpropanesulfonate.

Examples of epoxy group-containing monomer include but are not limited to: allyl glycidyl ether, methacryl glycidyl ether, butadiene monoepoxide, 1,2-epoxy-5-hexene, 1,2-epoxy-7-octene, 1,2-epoxy-9-decene, 8-hydroxy-6,7-epoxy-1-octene, 8-acetoxy-6,7-epoxy-1-octene, N-(2,3-epoxy)propylacrylamide, N-(2,3-epoxy)propylmethacrylamide, 4-acrylamidephenylglycidyl ether, 3-acrylamidephenylglycidyl ether, 4-methacrylamidephenylglycidyl ether, 3-methacrylamidephenylglycidyl ether, N-glycidoxymethylacrylamide, N-glycidoxymethylmethacrylamide, N-glycidoxyethylacrylamide, N-glycidoxyethylmethacrylamide, N-glycidoxypropylacrylamide, N-glycidoxypropylmethacrylamide, N-glycidoxybutylacrylamide, N-glycidoxybutylmethacrylamide, 4-acrylamidemethyl-2,5-dimethyl-phenylglycidyl ether, 4-methacrylamidemethyl-2,5-dimethyl-phenylglycidyl ether, acrylamidepropyldimethyl (2,3-epoxy)propylammonium chloride, methacrylamidepropyldimethyl(2,3-epoxy)propyl ammonium chloride, and glycidyl methacrylate.

The above-mentioned modified polyvinyl ester has an epoxy group to which is added the mercaptan having an aromatic amino group. This mercaptan is a compound possessing a mercapto group and an amino group connected to an aromatic ring. Its examples include 2-aminothiophenol, 3-aminothiophenol, 4-aminothiophenol, 2-(N-methyl)aminothiophenol, 3-(N-methyl)aminothiophenol, 4-(N-methyl)aminothiophenol, 2-(N,N-dimethyl)aminothiophenol, 3-(N,N-dimethyl)aminothiophenol, and 4-(N,N-dimethyl) aminothiophenol. They may be used in the form of acetate ester or benzoate ester.

The composition of the present invention should contain (A) PVA having an aromatic amino group and (B) a water resistance-imparting agent as essential components. It may also contain a solvent, an additive, a water-soluble resin, a polymeric aqueous dispersion, etc. depending on its use.

Examples of solvent include water or water in combination with alcohol, ketone, dimethylformamide, or dimethylsulfoxide; water is the preferred solvent.

Examples of additives include a defoaming agent, a dispersing agent, a nonionic or anionic surface active agent, a silane coupling agent, a pH adjuster, or a filler, such as calcium carbonate, clay, talc, and flour.

Examples of water-soluble resin include a cellulose derivative, such as carboxymethylcellulose and hydroxyethylcellulose; a (meth)acrylic polymer, such as poly(meth)acrylic acid, polyhydroxy (meth)acrylate or a copolymer thereof, and polyacrylamide; a polyvinyl pyrrolidone and a copolymer thereof; a PVA derivative, such as carboxyl group-containing modified PVA, sulfate group-containing modified PVA, sulfonate group-containing modified PVA, phosphate group-containing modified PVA, and quaternary ammonium group-containing modified PVA; and an ordinary PVA.

Examples of polymeric aqueous dispersion include those of a acrylic polymer or copolymer, ethylene-vinyl acetate copolymer, vinyl ester polymer or copolymer, and a styrene-butadiene copolymer.

The composition of the present invention imparts good water resistance even when used at room temperature. Therefore, it is useful as an adhesive requiring no heating, especially as woodworking adhesive, plywood adhesive, and two-part fast curing adhesive. By virtue of its ability to form film at low temperatures and to form film which exhibits strength and water resistance, it is also useful as a paper coating agent, especially as an agent (binder, undercoating, and top coating) to treat heat-sensitive paper which is incapable of heat treatment at high temperatures. Moreover, it is useful as adhesive for inorganic or organic matter, binder for ceramics, dispersing agent for pigment, stabilizer to inhibit polymerization of crosslinkable emulsion, image-forming material such as gelatin blend and photo-sensitive resin, hydrogel base for microbe-immobilizing gel and enzyme immobilizing gel, coating vehicle, and coating agent for inorganic and organic materials. It is also useful in application areas where a conventional water-soluble resin is used.

The composition of the present invention may be used in the form of solution or dispersion in water or water containing the above-mentioned organic solvent. It may be used in two ways as a paper overcoat. The first way is to mix component A (PVA having an aromatic amino group) and component B (water resistance-imparting agent), and apply the mixture to paper. The second way is to apply component (B) to paper and then apply component (A). It may also be used in two ways as an adhesive. The first way is to mix components (A) and (B) and then apply the mixture to one or both adherends. The second way is to apply component (A) to one adherend and component (B) to the other adherend.

The composition of the present invention produces its marked effect when used as an adhesive, particularly as an adhesive for woodworking article and an adhesive for plywood. In this case it is desirable to use component (A) in combination with an aqueous emulsion of an organic polymer.

The aqueous emulsion of organic polymer is one which is obtained from an unsaturated monomer by emulsion polymerization in the presence of a radical polymerization initiator in the presence of an emulsifier used for ordinary emulsion polymerization. Examples of unsaturated monomers are: vinyl ester unsaturated monomer such as vinyl acetate; acrylic unsaturated monomer such as alkyl acrylate ester (including (meth)acrylic acid, methyl (meth)acrylate, ethyl (meth)acrylate, butyl (meth)acrylate, and 2-ethylhexyl (meth)acrylate), (meth)acrylonitrile, (meth)acrylamide, and 2-hydroxyethyl (meth)acrylate; halogen-containing unsaturated monomer such as vinyl chloride, vinylidene chloride, and vinyl bromide; styrene monomer; olefin monomer such as ethylene and propylene; and diene monomer such as butadiene, isoprene, and chloroprene. These monomers may be used alone or in combination with one another.

The above-mentioned aqueous emulsion of organic polymer should preferably be prepared from vinyl ester, or a copolymer exemplified by ethylene-vinyl acetate copolymer and polyvinyl acetate; (meth)acrylate ester, or a copolymer exemplified by acrylate ester polymer and styrene-acrylate ester polymer, or styrene-diene copolymer, exemplified by styrene-butadiene copolymer.

The terms "(meth)acrylate", "(meth)acrylic" and "(meth)acrylonitrile" denote acrylate and methacrylate, acrylic and methacrylic, and acrylonitrile and methacrylonitrile respectively.

Having generally described this invention, a further understanding can be obtained by reference to certain specific examples which are provided herein for the purpose of illustration only and are not intended to be limiting unless otherwise specified. Further, the following Examples are also described in priority document Japanese patent application 265801/1996, filed Oct. 7, 1996, which is incorporated herein by reference.

EXAMPLES

In the Examples, "%" and "parts" mean "% by weight" and "parts by weight" unless otherwise stated.

Synthesis of PVA having an aromatic amino group (1) A reactor equipped with a stirrer, reflux condenser, nitrogen inlet tube, and thermometer was charged with 405 parts of vinyl acetate monomer, 11 parts of allylglycidyl ether, and 30 parts of methanol. The reactants were de-aerated by bubbling nitrogen gas for 15 minutes. Separately, an initiator solution was prepared by dissolving 4.5 parts of 2,2-azoisobutyronitrile in 15 parts of methanol. The solution was de-aerated by bubbling nitrogen gas.

The reactor was gradually heated up to 60° C., and the initiator solution was added to start polymerization. After polymerization for 4 hours at 60° C., the reactor was cooled to suspend polymerization. The reaction product was found to contain 54.8% of solids. With the reactor kept at 30° C., the reaction product was freed of unreacted vinyl monomer by intermittent addition of methanol under reduced pressure. Thus there was obtained a methanol solution (44.5%) of vinyl acetate copolymer. A portion of this methanol solution was placed in ether to recover the polymer, which was subsequently purified twice by reprecipitation from acetone-ether solution and dried at 40° C. under reduced pressure. This purified polymer was tested for proton nuclear magnetic resonance (NMR) employing $CDCl_3$ as solvent (NMR Spectrometer Model GSX-270, made by Nippon Denshi Co., Ltd. was used). It was also tested for intrinsic viscosity in acetone (according to JIS method) to calculate the viscosity-average molecular weight. The polymer was identified as a vinyl acetate copolymer containing 2.1 mol % of allylglycidyl ether unit (or epoxy group-containing unit) and having a viscosity-average molecular weight of 1050.

(2) A sample in an amount of 100 parts was taken from the methanol solution (44.5%) of the vinyl acetate copolymer obtained as mentioned above (1). This sample was placed in a reactor equipped with a stirrer, reflux condenser, nitrogen inlet tube, and thermometer. After bubbling nitrogen for 15 minutes, this sample was incorporated with 48 parts of methanol solution containing 8.0 parts of 2-aminothiophenol and 0.03 parts of sodium hydroxide. The reaction took place by heating the solution with stirring at 50° C. for 2 hours. The reaction product was cooled to 40° C. and hydrolyzed with 40 parts of 10% methanol solution of sodium hydroxide. After standing at 40° C. for 5 hours, the hydrolyzed product was crushed and neutralized with 8 parts of acetic acid. The neutralized product was washed with methanol for more than 48 hours using a Soxhlet extractor. Upon drying at 60° C. for more than 20 hours, there was obtained modified PVA. This modified PVA was examined by IR and proton NMR ($d_6$-DMSO). The complete disappearance of epoxy group and the introduction of aniline group (2.1 mol %) were confirmed. The content of vinyl alcohol was 97.0 mol %. A 4% solution of the PVA in DMSO gave a viscosity of 61.2 cp at 20° C.

Example 1

A 10% aqueous solution of the water resistant composition was prepared by dissolving 100 parts of the modified PVA obtained as mentioned above in water with heating and then adding 3 parts of ethylene glycol diglycidyl ether. This solution was made into a sheet by casting and subsequent drying at 20° C. After immersion in water at 20° C. for 24 hours this sheet was examined for the degree of swelling (in terms of the ratio of the weight after immersion in water to the absolute dry weight). Samples exhibited a degree of swelling twice that of the original sample. The sheet remained in good condition. In addition, the sheet was heat-treated at 60° C. and 120° C. for 10 minutes, and the heat-treated sample was measured for the degree of swelling. In both cases, the swelling was twice that of the original sample, and this indicates that the sheet had been made completely water-resistant at 20° C. The results are shown in Table 1.

Example 2

The same procedure as in Example 1 was repeated except that glyoxal was used in place of ethylene glycol diglycidyl ether (as a water resistance-imparting agent). The results are shown in Table 1.

Example 3

The same procedure as in Example 1 was repeated except that water-dispersible polyisocyanate ("Coronate C-3053" from Nippon Polyurethane Kogyo) was used in place of ethylene glycol diglycidyl ether (as a water resistance-imparting agent). The results are shown in Table 1.

Comparative Example 1

The same procedure as in Example 1 was repeated except that the modified PVA was replaced by unmodified PVA ("PVA-110", having a degree of polymerization of 1000 and a degree of hydrolysis of 98.5%, from Kuraray Co., Ltd.). The results are shown in Table 1.

Comparative Example 2

The same procedure as in Example 1 was repeated except that the modified PVA was replaced by amino group-modified PVA (having a degree of hydrolysis of 98.5 mol %, a degree of polymerization of 1000, and an amount of modification of 2 mol %) which was obtained by hydrolysis of a copolymer of N-vinylformamide and vinyl acetate. The results are shown in Table 1.

Comparative Example 3

The same procedure as in Example 1 was repeated except that the modified PVA was replaced by carboxylic acid-modified PVA (having a degree of hydrolysis of 98.0 mol %, a degree of polymerization of 1000, and an amount of modification of 2 mol %) which was obtained by hydrolysis of a copolymer of itaconic and vinyl acetate and that ethylene glycol diglycidyl ether (as a water resistance-imparting agent) was replaced by polyamide epichlorohydrin (from Nippon PMC) in an amount as shown Table 1. The results are shown in Table 1.

Comparative Example 4

The same procedure as in Example 1 was repeated except that the modified PVA was replaced by a mixture composed of 100 parts of 10% aqueous solution of acetoacetyl group-modified PVA (having a degree of hydrolysis of 98.0 mol %, a degree of polymerization of 1000, and an amount of modification of 5 mol %) and 5 parts of glyoxal. The results are shown in Table 1.

In the following Examples 4 to 6 and Comparative Examples 5 to 8, the resulting adhesive composition was used as a woodworking adhesive and plywood adhesive and its performance was evaluated by the method explained below:

(1) Woodworking adhesive
Wood-to-wood bond strength was measured under the following conditions.
Bonding.
Adherend: birch/birch (edge grain), 8% water content.
Coating weight: 150 g/m$^2$ (on both sides).
Assembly time: 1 minute.
Pressing: 20° C., 24 hours, pressure 10 kg/cm$^2$
Measurement.
Specimens were measured for compressive shear bond strength according to JIS K-6852.
Dry bond strength: measurement is carried out in the dry state after curing at 20° C. for 7 days.
Wet bond strength: measurement is carried out in the wet state after curing at 20° C. for 7 days and subsequent soaking in water at 20° C. for 3 hours.
Hot soaking test: measurement is carried out in the wet state after curing at 20° C. for 7 days and subsequent soaking in hot water at 60° C. for 3 hours (followed by cooling in water at 20° C.).

(2) Plywood adhesive
Plywood-to-plywood bond strength was measured under the following conditions:
Bonding.
Adherend: Plywood (P1) obtained by laminating with a urea/formaldehyde adhesive. Plywood (P2) obtained by laminating with an aqueous vinyl urethane adhesive.
Coating weight: 150 g/m$^2$ (on both sides).
Assembly time: 1 minute.
Pressing: 20° C., 20 minutes, pressure 6 kg/cm$^2$.
Measurement
Peeling due to heating: Specimens were cured at 20° C. for 3 days and then dried by hot air at 60° C. for 3 hours. The bond surface was examined for peeling.
Peeling due to soaking in hot water: Specimens were cured at 20° C. for 3 days and then soaked in hot water at 70° C. for 2 hours and finally dried by hot air at 60° C. for 3 hours. The bond surface was examined for peeling.
Peeling due to soaking in boiling water: Specimens were cured at 20° C. for 3 days and then soaked in boiling water for 4 hours and finally dried by hot air at 60° C. for 3 hours. The bond surface was examined for peeling.

Example 4

An aqueous adhesive was prepared from 100 parts of emulsion of ethylene-vinyl acetate copolymer ("OM-4200", containing 55% solids, from Kuraray Co., Ltd.) and 10 parts of 10% aqueous solution of the water-resistant composition in accordance with Example 1. Its performance in use as a woodworking adhesive and plywood adhesive was evaluated. The results are shown in Tables 2 to 4.

Example 5

An aqueous adhesive was prepared from 100 parts of emulsion of ethylene-vinyl acetate copolymer ("OM-4200", containing 55% solids, from Kuraray Co., Ltd.) and 10 parts of 10% aqueous solution of the water-resistant composition in Example 2. Its performance in use as a woodworking adhesive and plywood adhesive was evaluated. The results are shown in Tables 2 to 4.

Example 6

An aqueous adhesive was prepared from 100 parts of emulsion of ethylene-vinyl acetate copolymer ("OM-4200" containing 55% solids, from Kuraray Co., Ltd.) and 10 parts of 10% aqueous solution of the water-resistant composition in Example 3. Its performance in use as a woodworking adhesive and plywood adhesive was evaluated. The results are shown in Tables 2 to 4.

Comparative Example 5

An aqueous adhesive was prepared from 100 parts of emulsion of ethylene-vinyl acetate copolymer ("OM-4200" containing 55% solids, from Kuraray Co., Ltd.) and 10 parts of 10% aqueous solution of the water-resistant composition in Comparative Example 1. Its performance in use as a woodworking adhesive and plywood adhesive was evaluated. The results are shown in Tables 2 to 4.

Comparative Example 6

An aqueous adhesive was prepared from 100 parts of emulsion of ethylene-vinyl acetate copolymer ("OM-4200" containing 55% solids, from Kuraray Co., Ltd.) and 10 parts of 10% aqueous solution of the water-resistant composition in Comparative Example 2. Its performance in use as a woodworking adhesive and plywood adhesive was evaluated. The results are shown in Tables 2 to 4.

Comparative Example 7

An aqueous adhesive was prepared from 100 parts of emulsion of ethylene-vinyl acetate copolymer ("OM-4200", containing 55% solids, from Kuraray Co., Ltd.) and 10 parts of 10% aqueous solution of the water-resistant composition in Comparative Example 3. Its performance in use as a woodworking adhesive and plywood adhesive was evaluated. The results are shown in Tables 2 to 4.

Comparative Example 8

An aqueous adhesive was prepared from 100 parts of emulsion of ethylene-vinyl acetate copolymer ("OM-4200" containing 55% solids, from Kuraray Co., Ltd.) and 10 parts of 10% aqueous solution of the water-resistant composition in Comparative Example 4. Its performance in use as a woodworking adhesive and plywood adhesive was evaluated. The results are shown in Tables 2 to 4.

Example 7

Preparation and bond test of two-part adhesive composition (1) A first solution was prepared from 100 parts of emulsion of ethylene-vinyl acetate copolymer ("OM-4200" containing 55% solids, from Kuraray Co., Ltd.), 10 parts of 10% aqueous solution of PVA containing an aromatic amino group (prepared as mentioned above), and 50 parts of calcium carbonate ("P30" from Toyo Fine Chemicals, Co., Ltd.).

(2) A second solution was prepared being a 15% aqueous solution of glyoxal.

(3) The thus prepared two solutions were used as a two-part adhesive composition.

(4) Specimens of birch (edge grain) measuring 25×25×10 mm were prepared. Five pairs of specimens were used for each test run.

The first solution was applied (about 200 g/m$^2$) to a first specimen (as an adherend) and the second solution was applied (about 50 g/m$^2$) to a second adherend. The two specimens, with coated sides facing each other, were pressed against each other under a pressure of about 10 kg/cm$^2$. Each set of specimens was pressed for a prescribe period of time as shown in Table 5. After pressing, the specimens were cured for 5 minutes or 24 hours. Then the bond strength of the specimens was measured according to JIS K-6852 (Method for testing the compressive bond strength of adhesive). An average of five measurements was taken.

The ratio (%) of adherend failure (instead of interfacial peeling) is also shown in parentheses. The ratio of adherend failure is proportional to the bond strength of the adhesive composition.

The above-mentioned adhesion test and measurement were carried out in an atmosphere at 20° C.

The bonded specimens were cured for 24 hours and then soaked in hot water at 60° C. for 60 minutes and finally measured for bond strength. The results are shown in Table 5.

Example 8

The same procedure as in Example 7 was repeated except that the glyoxal aqueous solution (as a second solution) was replaced by 15% aqueous solution of ammonium persulfate. The results are shown in Table 5.

Comparative Example 9

The bonding test was carried out in the same manner as in Example 7 except that the glyoxal aqueous solution (as a second solution) was not used (or only the first solution was used for bonding). The results are shown in Table 5.

It is noted from Table 5 that the two-part adhesive of the present invention exhibits the initial bond strength and final bond strength at room temperature and it also exhibits high wet bond strength even when bonding is carried out at room temperature.

The above-mentioned examples demonstrate that the composition of the present invention exhibits very good water resistance when used at room temperature. This is advantageous concerning energy conservation. Therefore, the present invention is of great industrial value.

TABLE 1

| | Component (A) | | | | | Degree of swelling (times) | | |
| --- | --- | --- | --- | --- | --- | --- | --- | --- |
| | Amount of modifier (mol %) | Degree of polymerization | Degree of hydrolysis (mol %) | Component (B) | Ratio (A/B) | Without heat treatment | Heat treatment at 60° C. | Heat treatment at 120° C. |
| Example 1 | 2.1 | 1000 | 98.7 | Epoxy (1) | 100/3 | 2.0 | 2.0 | 2.0 |
| Example 2 | 2.1 | 1000 | 98.7 | Glyoxal (2) | 100/3 | 2.5 | 2.3 | 2.1 |
| Example 3 | 2.1 | 1000 | 98.7 | Isocyanate (3) | 100/3 | 3.3 | 2.8 | 2.6 |
| Comparative Example 1 | 0 | 1000 | 98.5 | Epoxy (1) | 100/3 | dissolved | dissolved | dissolved |
| Comparative Example 2 | 2.0 | 1000 | 98.5 | Epoxy (1) | 100/3 | 18.3 | 8.2 | 2.9 |
| Comparative Example 3 | 2.0 | 1000 | 98.0 | PAE (4) | 100/30 | 8.3 | 6.7 | 2.9 |
| Comparative Example 4 | 5.0 | 1000 | 98.0 | Glyoxal (2) | 100/5 | 9.0 | 6.3 | 2.0 |

(1) Ethyleneglycol diglycidyl ether
(2) 40% aqueous solution of glyoxal
(3) Polyisocyanate compound ("Coronate C-3053" from Nippon Polyurethane)
(4) Polyamide epichlorohydrin (from Nippon PMC)
(5) PVA modified with itaconic acid
(6) PVA modified with acetoacetyl group

TABLE 2

| | Performance (as woodworking adhesive) (kg/cm$^2$) | | |
|---|---|---|---|
| | Dry strength | Wet strength | Hot-water strength |
| Example 4 | 155 | 74 | 45 |
| Example 5 | 150 | 55 | 40 |
| Example 6 | 145 | 65 | 45 |
| Comparative Example 5 | 120 | 30 | 5 |
| Comparative Example 6 | 130 | 35 | 10 |
| Comparative Example 7 | 130 | 15 | 5 |
| Comparative Example 8 | 125 | 35 | 10 |

TABLE 3

| | Performance (as plywood adhesive) (adherent P1) | | |
|---|---|---|---|
| | Heating | Soaking in hot water | Soaking in boiling water |
| Example 4 | no peeling | no peeling | no peeling |
| Example 5 | no peeling | no peeling | no peeling |
| Example 6 | no peeling | no peeling | no peeling |
| Comparative Example 5 | peeling 5% | peeling 70% | peeling 100% |
| Comparative Example 6 | no peeling | peeling 50% | peeling 100% |
| Comparative Example 7 | peeling 5% | peeling 90% | peeling 100% |
| Comparative Example 8 | no peeling | peeling 80% | peeling 100% |

TABLE 4

| | Performance (as plywood adhesive) (adherent P2) | | |
|---|---|---|---|
| | Heating | Soaking in hot water | Soaking in boiling water |
| Example 4 | no peeling | no peeling | no peeling |
| Example 5 | no peeling | no peeling | no peeling |
| Example 6 | no peeling | no peeling | no peeling |
| Comparative Example 5 | peeling 5% | peeling 75% | peeling 100% |
| Comparative Example 6 | no peeling | peeling 55% | peeling 100% |
| Comparative Example 7 | peeling 5% | peeling 80% | peeling 100% |
| Comparative Example 8 | no peeling | peeling 80% | peeling 100% |

TABLE 5

| | First solution (parts) | | | | Compressive shear strength (kg/cm$^2$) (4) | | | | |
|---|---|---|---|---|---|---|---|---|---|
| | PVA aq. solution (1) | Em (2) | Calcium carbonate | Second solution | Curing time (3) | Pressing time (minutes) | | | |
| | | | | | | 1 | 3 | 5 | 10 |
| Example 7 | 10 | 100 | 50 | Glyoxal aq. Solution (5) | 5 min | 25 | 26 | 40 | 51 |
| | | | | | 24 hr | 160 (0) | 171 (10) | 183 (4) | 190 (55) |
| Example 8 | 10 | 100 | 50 | Ammonium persulfate aq. Solution (6) | 5 min | 26 | 30 | 42 | 52 |
| | | | | | 24 hr | 160 (0) | 175 (15) | 187 (45) | 193 (60) |
| Comparative Example 9 | 10 | 100 | 50 | none | 5 min | 5 | 12 | 23 | 35 |
| | | | | | 24 hr | 45 (0) | 50 (0) | 120 (0) | 180 (0) |
| Example 7 | 10 | 100 | 50 | Glyoxal aq. Solution (5) | (7) | 31 | 35 | 37 | 41 |
| Example 8 | 10 | 100 | 50 | Ammonium persulfate aq. Solution (6) | (7) | 33 | 36 | 37 | 42 |
| Comparative Example 9 | 10 | 100 | 50 | none | (7) | 0 | 0 | 0 | 0 |

(1) 10% aqueous solution of PVA containing aromatic amino group explained before Example 1.
(2) emulsion of ethylene-vinyl acetate copolymer ("OM-4200" containing 55% solids, from Kuraray Co., Ltd.
(3) Curing time after release of pressing
(4) An average value of five pairs of specimens. Parenthesized numbers indicate the ratio (%) of adherend failure that occurred during the compressive sear strength test.
(5) 15% aqueous solution of glyoxal
(6) 15% aqueous solution of ammonium persulfate
(7) soaked in hot water at 60° C. for 60 minutes after curing for 24 hours.

What is claimed as new and desired to be secured by Letters Patent of the United States is:

1. A composition comprising (A) polyvinyl alcohol having an amino group connected to a phenyl group and (B) at least one water resistance-imparting agent selected from the group consisting of polyepoxy compound, aldehyde compound, polyisocyanate compound, and water-soluble oxidizing agent.

2. The composition of claim 1, wherein said polyvinyl alcohol is one which has the structural unit represented by the formula (1) or (2)

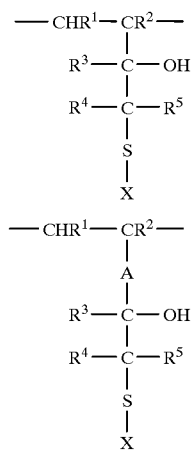

where $R^1$, $R^2$, $R^3$, $R^4$, and $R^5$ each denotes a hydrogen atom or a hydrocarbon group, which may have a substituent group, of carbon number 8 or below; A denotes a divalent hydrocarbon group or a divalent hydrocarbon group containing at least one heteroatom selected from the group consisting of nitrogen, oxygen and sulfur; S denotes a sulfur atom, and X denotes a monovalent group containing an amino group connected to a phenyl group.

3. The composition of claim 2, wherein the amount of the structural unit containing an amino group connected to a phenyl group is 0.01–30 mol %.

4. The composition of claim 2, wherein the amount of the structural unit containing an amino group connected to a phenyl group is 0.02–20 mol %.

5. The composition of claim 2, wherein the amount of the structural unit containing an amino group connected to a phenyl group is 0.05–15 mol %.

6. The composition of claim 1, wherein the ratio (A/B) of component (A) to component (B) is from 99.99/0.01 to 10/90 by weight.

7. The composition of claim 1, wherein said polyvinyl alcohol has a degree of polymerization of 50 to 10,000.

8. The composition of claim 1, wherein said polyvinyl alcohol has a degree of polymerization of 100 to 7,000.

9. The composition of claim 1, wherein said polyvinyl alcohol has a degree of polymerization of 100 to 5,000.

10. The composition of claim 1, wherein said polyvinyl alcohol has a degree of hydrolysis of at least 50 mol %.

11. The composition of claim 1, wherein said polyvinyl alcohol has a degree of hydrolysis of at least 70 mol %.

12. The composition of claim 1, wherein said polyepoxy compound is selected from the group consisting of glycidyl ether, glycidyl ether-ester, glycidyl amine, linear aliphatic epoxy resin and alicyclic epoxy resin.

13. The composition of claim 1, wherein said aldehyde is selected from the group consisting of monoaldehyde and dialdehyde.

14. The composition of claim 1, wherein said polyisocyanate is selected from the group consisting of tolylenediisocyanate, hydrogenated tolylenediisocyanate, trimethylolpropane tolylenediisocyanate adduct, triphenylmethanetriisocyanate, methylene-bis-diphenylisocyanate, hydrogenated methylene-bis-diphenylisocyanate, polymerized methylene-bis-diphenylisocyanate, hexamethylenediisocyanate, xylylenediisocyanate, 4,4-dicyclohexyldiisocyanate and isophoronediisocyanate.

15. The composition of claim 1, wherein said water-soluble oxidizing agent is selected from the group consisting of persulfate, hydrogen peroxide, benzoyl peroxide, dicumyl peroxide, cumene hydroperoxide, t-butylhydroperoxide, potassium bromate, t-butyl peracetate and t-butyl benzoate.

16. A two-part adhesive comprising component (A) and component (B) as defined in claim 1.

17. An interlaminar adhesive comprising the composition of claim 1.

18. The composition of claim 1, further comprising a solvent, an additive, a water-soluble resin or a polymeric aqueous dispersion.

19. The composition of claim 18, wherein said solvent is water or water in combination with a compound selected from the group consisting of alcohol, ketone, dimethylformamide and dimethylsulfoxide.

20. The composition of claim 18, wherein said additive is selected from the group consisting of a defoaming agent, a dispersing agent, a nonionic surfactant, an anionic surfactant, a silane coupling agent, a pH adjuster and a filler.

* * * * *